Dec. 2, 1930.  C. J. BOCK  1,783,774
BRAKE CROSS SHAFT MOUNTING
Filed Aug. 10, 1928
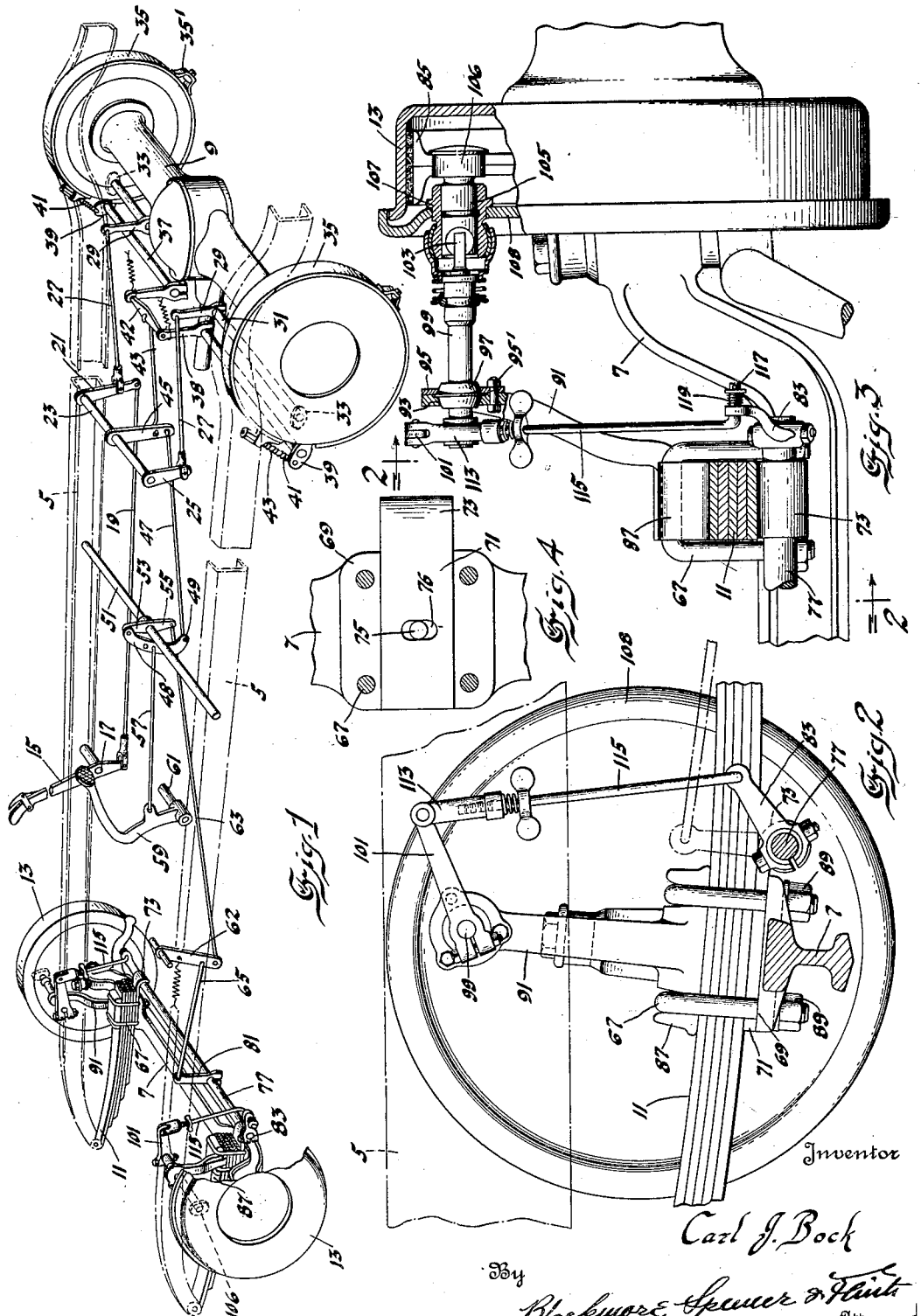
Inventor
Carl J. Bock
By
Blackmore, Spencer & Flint
Attorneys Patented Dec. 2, 1930

1,783,774

UNITED STATES PATENT OFFICE

CARL J. BOCK, OF PONTIAC, MICHIGAN, ASSIGNOR TO YELLOW TRUCK & COACH MANUFACTURING COMPANY, OF PONTIAC, MICHIGAN, A CORPORATION OF MAINE

BRAKE CROSS SHAFT MOUNTING

Application filed August 10, 1928. Serial No. 298,830.

This invention relates to brakes and has been designed as an improved brake operating means for vehicles.

An object of the invention is to simplify the parts of the brake hook-up relating to the mechanism between the manually operated pedal or lever and the brakes on the front wheels. One important feature of the invention is the mounting of the operating shafts on and adjacent to the front axle. Other objects and advantages will be understood from a reading of the following description.

In the drawing:

Figure 1 illustrates in perspective the novel brake hook-up;

Figure 2 is a transverse section through the front axle showing the brake actuating means in side elevation, the view being substantially on line 2—2 of Figure 3;

Figure 3 is a view of the actuating means in end elevation, the section being transversely of the vehicle through the vehicle spring; and Figure 4 is a plan view of a detail.

Referring by reference characters to the drawing, numeral 5 is used to designate the chassis frame, the frame being shown by dotted lines since it is not a part of this invention.

At 7 is shown the front axle and at 9 the rear axle housing. The springs to support the chassis frame and body from the axles are shown at 11. Each wheel is provided with a brake drum 13. The rear wheel drum is engaged by an internal brake, not shown, for actuation by a hand lever 15. This lever 15, pivoted at 17, is intended to pull a rod 19 connected to an arm 21 rigid with shaft 23. The shaft has a second rigid arm 25.

To the arms 21 and 25 are connected rearwardly directed links 27. Each link is connected to an arm 29 on the shaft 31 journaled in any preferred way. The shaft 31 is intended to apply the internal brakes and to that end may be equipped with a cam 33, as shown in Figure 1. The brake construction thus far described is the conventional emergency brake and is, as shown, entirely disassociated from the service brake.

Surrounding each rear wheel brake drum is a band 35 anchored as at 35' preferably to the fixed backing plate, as usual. The adjacent ends of the band are arranged to be drawn together to frictionally engage the drum by the rotation of suitably journaled shafts 37. Lever arms 39 are carried by shafts 37, these arms being associated with rods 41 and springs 43 to apply the brake in the usual manner. The adjacent ends of shafts 37 have arms 38, said arms being connected to an equalizer 42. At the middle point of equalizer 42 is connected a link 43 extending to an arm 45 serving as an idler and conveniently mounted for rotation on shaft 23. From the end of idler 45, link 47 extends to an equalizer 48 functioning to equalize between the front wheel brake system and the rear wheel brake system. The link 47 is pivoted to the lower end of the equalizer, as at 49.

A rockshaft 51 is located in a convenient position intermediate the ends of the vehicle, extends transversely of the vehicle and may be journaled in the side frame members. It has an upper arm 53 intermediate its length, to which the upper end of equalizer 48 is pivoted. Shaft 51 is also provided with an arm 55, which lies in the same plane as arm 53 and extends in a diametrically opposite direction. This arm 55 is for connection with the front wheel brakes. The equalizer 48 has preferably a plurality of intermediate openings any one of which is adapted to be pivotally connected with a link 57 extending rearwardly from a pedal 59, the latter being pivoted as at 61 to any convenient part of the vehicle chassis.

Between the front axle and rockshaft 51 is an idler arm 62. A link 63 connects arm 62 with arm 55 of shaft 51. From idler 62 a link 65 extends forwardly to a position adjacent the front axle, links 63 and 65 extending longitudinally in a position substantially midway between the side members of the frame.

Clips 67 are used to clamp springs 11 to the front axle 7. The axle is formed with a seat 69 to receive a spring and this seat is provided with apertures to receive the legs of the clips. Between the lower leaf of the spring and the seat 69 is a plate 71 terminating at the rear side of the axle in an eye 73. Preferably, and as shown in Figure 4, there is provided on the axle a stud 75. This stud is received in a slot 76 in plate 71, the slot extending transversely of plate 71 and in the direction of the long axis of the axle. The plate 71 is of less width than the spring leaves so that, owing to its dimensions and the presence of the slot, it can be adjusted transversely of the vehicle. A shaft 77 is journaled in the eyes 73 of plates 71. This shaft may be rotated by means of an arm 81 suitably clamped to an intermediate position of shaft 77. This arm 81 is to be pivotally connected to link 65. At each end of shaft 77 there is secured an arm 83, this arm being associated with mechanism for actuating the front internal brake shoes 85 against the drums 13.

Above the spring 11 and also above the plates 71 is a block 87 suitably shaped to accommodate the clips 67. The legs of the clips embrace this block 87, the spring 11 and the plates 71, and extend through the openings provided therefor in the spring seat of the axle, and nuts 89 are applied to hold the parts assembled. The block 87 is formed with an upstanding arm 91, as shown in the drawing. This arm is formed at its upper end with a tapered opening 93 co-operating with a similarly shaped cap 95 held by fastening means 95'. The parts 93 and 95 form a socket for retaining a bushing 97, in which is journaled a rockshaft 99.

Clamped to shaft 99 inwardly of and adjacent the bearing is an arm 101. Shaft 99 extends outwardly toward the brake drum of the wheel and is united by a universal joint 103, of any preferred kind, with a short shaft 105 journaled in a sleeve 107 carried by the dust plate or backing plate 108 which is, as usual, secured to the steering knuckle of the wheel. The joint 103 is located substantially over the swivelling axis of the wheel so that the wheel may be swivelled for steering purposes without interfering with the action of the brake. The short shaft 105, for the purpose of applying the brake, may be equipped with a cam 106 received between the adjacent ends of the brake band, or between the brake shoes, whichever be the form of brake used.

Pivoted to arm 101 is a forked clevis 113. A link 115 has an angled end 117 passed through an opening in arm 83 of shaft 77. The angled end has a retainer and an anti-rattling spring 119, as shown in Figure 3. Link 115 extends into the clevis 113 with which it has a threaded connection, as shown. It will therefore be seen that a clockwise movement of arm 83 produces a similar movement of arm 101, rocks shaft 99, rotates the cam and applies the brake.

It will be noted that by the use of links 63 and 65 there is avoided the commonly used system of links extending forward from each end of the equivalent of shaft 51. It will also be seen that the parts 71 and 87 are very conveniently clamped in position by the usual spring clips and that these parts 87 and 71 serve to journal the necessary shaft for operating the front wheel brakes.

I claim:

1. In brake mechanism for vehicles, an axle, supporting springs, plates positioned between the axle and the springs, said plates having eyes located in alignment, an axle rockshaft journaled in said eyes, means to rotate said axle rockshaft, a block above each spring, means to clamp said block, spring, and plate to the axle, each block having an upwardly directed arm, brake operating shafts journaled in said brackets, and connecting means between said axle rockshaft and said brake operating shafts.

2. The invention defined by claim 1, said plate being of less width than said spring, a stud on said axle, said plate having a slot to receive said stud to permit adjustment of the plate transversely of the vehicle.

3. In a brake for vehicles, a front axle, steering knuckles for wheels associated therewith, brake drums for the wheels, a backing plate associated with each knuckle, supporting springs on the axle, a plate beneath each spring, said plate having an eye, an axle rockshaft journaled in said eyes, a block above each spring, said blocks having arms, brake operating shafts journaled in said arms, brake actuating shafts journaled in said backing plates, joints between said actuating shafts and operating shafts, link means between said axle rockshaft and the brake operating shafts, means to rotate the axle rockshaft to apply the brake.

In testimony whereof I affix my signature.

C. J. BOCK.